United States Patent
Wilhelmsson et al.

(10) Patent No.: US 10,326,570 B2
(45) Date of Patent: Jun. 18, 2019

(54) FREQUENCY SELECTIVE SCHEDULING

(71) Applicant: Telefonaktiebolaget LM Ericsson (publ), Stockholm (SE)

(72) Inventors: Leif Wilhelmsson, Dalby (SE); Thomas Nilsson, Malmo (SE); Meng Wang, Sundbyberg (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 109 days.

(21) Appl. No.: 15/523,374

(22) PCT Filed: Mar. 24, 2015

(86) PCT No.: PCT/EP2015/056268
§ 371 (c)(1),
(2) Date: Apr. 29, 2017

(87) PCT Pub. No.: WO2016/066280
PCT Pub. Date: May 6, 2016

(65) Prior Publication Data
US 2017/0257198 A1    Sep. 7, 2017

Related U.S. Application Data

(60) Provisional application No. 62/072,831, filed on Oct. 30, 2014.

(51) Int. Cl.
*H04W 4/00*   (2018.01)
*H04L 5/00*   (2006.01)
(Continued)

(52) U.S. Cl.
CPC .......... *H04L 5/0037* (2013.01); *H04L 5/0048* (2013.01); *H04L 5/0055* (2013.01);
(Continued)

(58) Field of Classification Search
None
See application file for complete search history.

(56) References Cited

U.S. PATENT DOCUMENTS

2004/0264507 A1* 12/2004 Cho ................. H04L 1/0001
370/480
2006/0153060 A1* 7/2006 Cho ................. H04B 7/0619
370/208

(Continued)

FOREIGN PATENT DOCUMENTS

| CN | 102468947 A | 5/2012 |
|---|---|---|
| WO | 2009072842 A2 | 6/2009 |
| WO | 2013006593 A1 | 1/2013 |

OTHER PUBLICATIONS

PCT International Search Report, dated Jun. 19, 2015, in connection with International Application No. PCT/EP2015/056268, all pages.

(Continued)

*Primary Examiner* — Bob A Phunkulh
(74) *Attorney, Agent, or Firm* — Leffler Intellectual Property Law, PLLC

(57) ABSTRACT

There is provided mechanisms for frequency selective scheduling of wireless devices in a communication network. A method is performed by a wireless network node. The method comprises transmitting a first packet to at least one wireless device over the entire available bandwidth of the communication network, wherein the first packet comprises information identifying which wireless devices are addressed by the packet, and which downlink sub-carriers are used for data transmission to the addressed wireless devices. The method comprises receiving a second packet on uplink sub-carriers allocated to at least the addressed wireless devices and therefrom determining channel quality indications for the uplink sub-carriers. The uplink sub-carriers are allocated to enable the channel quality indica-
(Continued)

tions to be determined over the entire bandwidth for at least each one of the addressed wireless devices.

24 Claims, 8 Drawing Sheets

(51) Int. Cl.
*H04W 72/08* (2009.01)
*H04W 72/12* (2009.01)
*H04W 84/12* (2009.01)
*H04L 27/26* (2006.01)

(52) U.S. Cl.
CPC ....... *H04W 72/08* (2013.01); *H04W 72/1278* (2013.01); *H04L 27/2601* (2013.01); *H04W 84/12* (2013.01)

(56) References Cited

U.S. PATENT DOCUMENTS

| | | | | |
|---|---|---|---|---|
| 2006/0246916 A1* | 11/2006 | Cheng | ............... | H04L 5/0007 455/450 |
| 2007/0133458 A1* | 6/2007 | Chandra | ............... | H04L 1/0025 370/329 |
| 2007/0218917 A1* | 9/2007 | Frederiksen | ........ | H04W 72/085 455/450 |
| 2007/0268846 A1* | 11/2007 | Proctor, Jr. | ........ | H04B 7/15535 370/279 |
| 2009/0185577 A1* | 7/2009 | Kishiyama | ............ | H04L 1/0003 370/465 |
| 2009/0323542 A1* | 12/2009 | Aiba | ............ | H04L 1/0001 370/252 |
| 2010/0035653 A1 | 2/2010 | Chang et al. | | |
| 2012/0002599 A1 | 1/2012 | Annavajjala et al. | | |
| 2012/0190395 A1* | 7/2012 | Pan | ............ | H04L 5/001 455/509 |
| 2013/0028169 A1* | 1/2013 | Bontu | ............ | H04B 7/15542 370/315 |
| 2014/0198766 A1* | 7/2014 | Siomina | ............ | H04W 72/082 370/330 |
| 2014/0274202 A1* | 9/2014 | Zhao | ............ | H04W 88/06 455/552.1 |
| 2014/0295859 A1* | 10/2014 | Shin | ............ | H04B 7/026 455/450 |

OTHER PUBLICATIONS

PCT Written Opinion, dated Jun. 19, 2015, in connection with International Application No. PCT/EP2015/056268, all pages.
M. Condoluci et al., On the impact of Frequency Selectivity on Multicast Subgroup Formation in 4G Networks, 2013 IEEE International Symposium on Broadband Multimedia Systems and Broadcasting (BMSB), Jun. 5, 2013, pp. 1-6.
Klaus I. Pedersen et al., Frequency Domain Scheduling for OFDMA with Limited and Noisy Channel Feedback, Vehicular Technology Conference, 2007, VTC-2007 Fall, 2007 IEEE 66th, Sep. 1, 2007, pp. 1792-1796.
Rainer Schoenen et al., Channel Quality Indication for Adaptive Resource Scheduling in Multihop OFDMA Systems, Wireless Conference, 2009, EW 2009, European May 17, 2009 IEEE, Piscataway, NJ, USA, pp. 58-62.
Hanqing Lou et al., Sub-Channel Selection for Multi-User Channel Access in Next Generation Wi-Fi, InterDigital Communications, Inc. 6 pages.
Brian Hart et al, Cisco Systems, IEEE 802.11-14/0855r0, Techniques for Short Downlink Frames, Jul. 2014, 5 pages.
Kaushik Josiam et al., Samsung, IEEE 11-10/0858r0, Analysis on Multiplexing Schemes exploiting frequency selectivity in WLAN Systems, Jul. 15, 2014, 18 pages.
Tianyu Wu et al., MediaTek, IEEE 802.11-14/1227r3, OFDMA Performance Analysis, Sep. 15, 2014, 11 pages.

\* cited by examiner

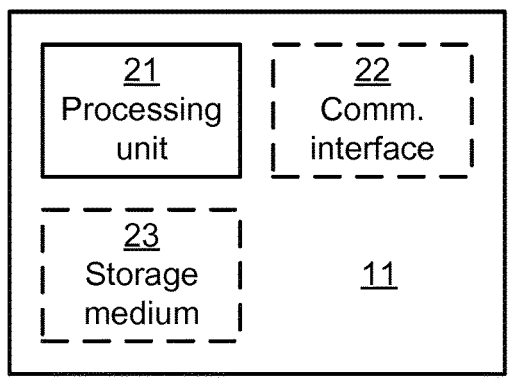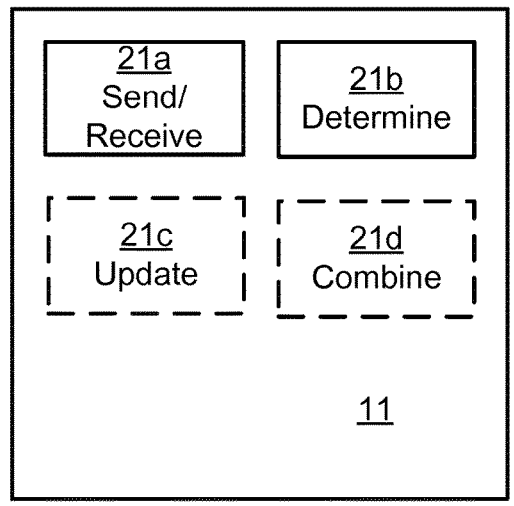
Fig. 10aFig. 10b
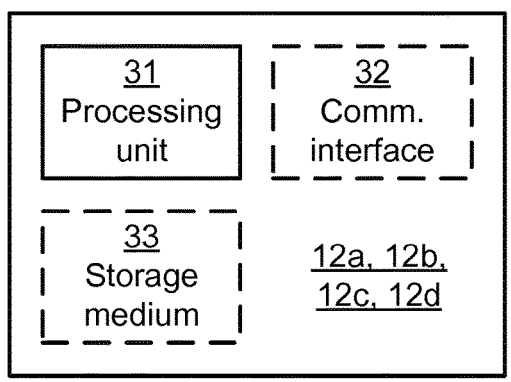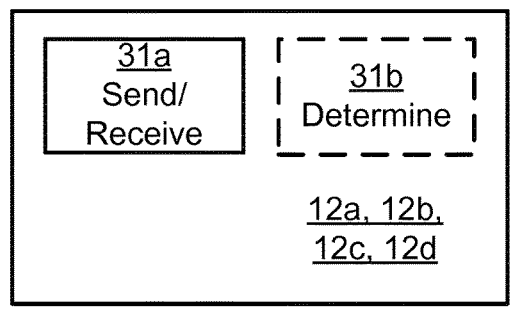
Fig. 11aFig. 11b
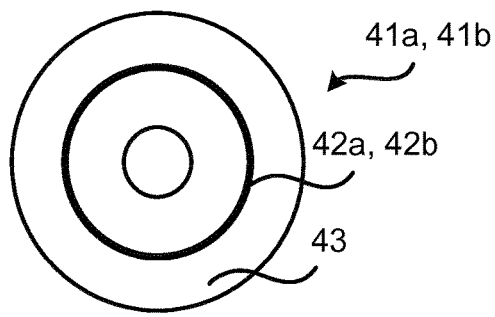
Fig. 12

FREQUENCY SELECTIVE SCHEDULING

TECHNICAL FIELD

Embodiments presented herein relate to frequency selective scheduling, and particularly to methods, a wireless network node, a wireless device, computer programs, and a computer program product for frequency selective scheduling of wireless devices in a communication network.

BACKGROUND

In communication networks, there may be a challenge to obtain good performance and capacity for a given communication protocol, its parameters and the physical environment in which the communication network is deployed.

For example, standards for wireless communication networks are commonly based on usage of orthogonal frequency division multiplexing (OFDM). One reason may be that OFDM allows for relatively low complex processing in case of high data rates and large bandwidth where the communication channel is frequency selective. OFDM also allows for a simple way to share the channel between different users, as represented by wireless devices (WDs), by simply allocating different sets of sub-carriers to different wireless devices (i.e., users). This principle is known as orthogonal frequency-division multiple access (OFDMA). The set of sub-carriers allocated to different wireless devices may either be localized, i.e., where the sub-carriers to one user are provided next to one another, or the set of sub-carriers may be distributed, i.e., where the sub-carriers are spread out and interlaced with sub-carriers carrying data to other wireless devices.

For practical reasons, localized sub-carriers may typically be used. In downlink transmission, i.e., from the wireless network node to the wireless devices, the allocation of sub-carriers may in principle be such that the wireless network node allocates a sub-carrier to the wireless device that has the most favorable channel conditions. Such schemes of allocating the sub-carriers are commonly known as frequency selective scheduling.

Although frequency selective scheduling may potentially give a performance gain, it requires that the wireless network node has knowledge of the channels to the different wireless devices. Such knowledge is typically obtained through channel sounding. Channel sounding may be achieved by measuring the channels between the wireless network node and the different wireless devices, and based on the obtained measurements, the wireless network node may decide how to allocate sub-carriers to different wireless devices.

When a data packet is successfully demodulated, the receiving wireless device may immediately send a positive acknowledgement (ACK) in the form of an ACK packet (or frame) to the wireless network node. If the wireless network node that sends the data packet does not receive the ACK frame, it assumes that the data packet was not correctly received and may decide to re-transmit the data packet to the wireless device. OFDMA may trigger multiple ACKs because of simultaneous transmission to different wireless devices.

One issue with the frequency selective scheduling is that it requires knowledge of the channels in order to determine which sub-carriers to be associated with which wireless devices, and that the time required to obtain knowledge of the channels reduces the gain that may be obtained during the actual data transmission. In particular, in cases when the channels are changing fast, the overhead associated with channel measurements become prohibitive. In addition, when the number of wireless devices is large, so that a large number of channels need to be estimated, frequency selective scheduling may not be a feasible alternative.

Hence, there is still a need for improved frequency selective scheduling of wireless devices in communication networks.

SUMMARY

An object of embodiments herein is to provide improved frequency selective scheduling of wireless devices in communication networks.

According to a first aspect there is presented a method for frequency selective scheduling of wireless devices in a communication network. The method is performed by a wireless network node. The method comprises transmitting a first packet to at least one wireless device over the entire available bandwidth of the communication network, wherein the first packet comprises information identifying which wireless devices are addressed by the packet, and which downlink sub-carriers are used for data transmission to the addressed wireless devices. The method comprises receiving a second packet on uplink sub-carriers allocated to at least the addressed wireless devices and therefrom determining channel quality indications for the uplink sub-carriers. The uplink sub-carriers are allocated to enable the channel quality indications to be determined over the entire bandwidth for at least each one of the addressed wireless devices.

Advantageously this provides efficient frequency selective scheduling of wireless devices in communication networks.

Advantageously this allows for frequency selective scheduling without explicit sounding, which effectively means there is very little, or even no, overhead associated with the channel estimation needed to perform the frequency selective scheduling.

According to a second aspect there is presented a wireless network node for frequency selective scheduling of wireless devices in a communication network. The wireless network node comprises a processing unit. The processing unit is configured to transmit a first packet to at least one wireless device over the entire available bandwidth of the communication network, wherein the first packet comprises information identifying which wireless devices are addressed by the first packet, and which downlink sub-carriers are used for data transmission to the addressed wireless devices. The processing unit is configured to receive a second packet on uplink sub-carriers allocated to at least the addressed wireless devices and therefrom to determine channel quality indications for the uplink sub-carriers. The uplink sub-carriers are allocated to enable the channel quality indications to be determined over the entire bandwidth for at least each one of the addressed wireless devices.

According to a third aspect there is presented a computer program for frequency selective scheduling of wireless devices in a communication network, the computer program comprising computer program code which, when run on a processing unit of a wireless network node, causes the processing unit to perform a method according to the first aspect.

According to a fourth aspect there is presented a method for enabling frequency selective scheduling of a wireless device in a communication network. The method is performed by the wireless device. The method comprises receiving a first packet from a wireless network node, wherein the first packet has been sent over the entire available bandwidth of the communication network and comprises information identifying which wireless devices are addressed by the first packet, and which downlink sub-carriers are used for data transmission to the addressed wireless devices. The method comprises transmitting a second packet to the wireless network node on uplink sub-carriers The uplink sub-carriers are allocated to enable channel quality indications to be determined over said entire bandwidth for said wireless device.

According to a fifth aspect there is presented a wireless device for enabling frequency selective scheduling of a wireless device in a communication network. The wireless device comprises a processing unit. The processing unit is configured to receive a first packet from a wireless network node, wherein the first packet has been sent over the entire available bandwidth of the communication network and comprises information identifying which wireless devices are addressed by the first packet, and which downlink sub-carriers are used for data transmission to the addressed wireless devices. The processing unit is configured to transmit a second packet to the wireless network node on uplink sub-carriers. The uplink sub-carriers are allocated to enable channel quality indications to be determined over said entire bandwidth for said wireless device.

According to a sixth aspect there is presented a computer program for enabling frequency selective scheduling of a wireless device in a communication network, the computer program comprising computer program code which, when run on a processing unit of a wireless device, causes the processing unit to perform a method according to the fourth aspect.

According to a seventh aspect there is presented a computer program product comprising a computer program according to at least one of the third aspect and the sixth aspect and a computer readable means on which the computer program is stored.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 10a is a schematic diagram showing functional units of a wireless network node according to an embodiment;

FIG. 10b is a schematic diagram showing functional modules of a wireless network node according to an embodiment;

FIG. 11a is a schematic diagram showing functional units of a wireless device according to an embodiment;

FIG. 11b is a schematic diagram showing functional modules of a wireless device according to an embodiment;

FIG. 12 shows one example of a computer program product comprising computer readable means according to an embodiment;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
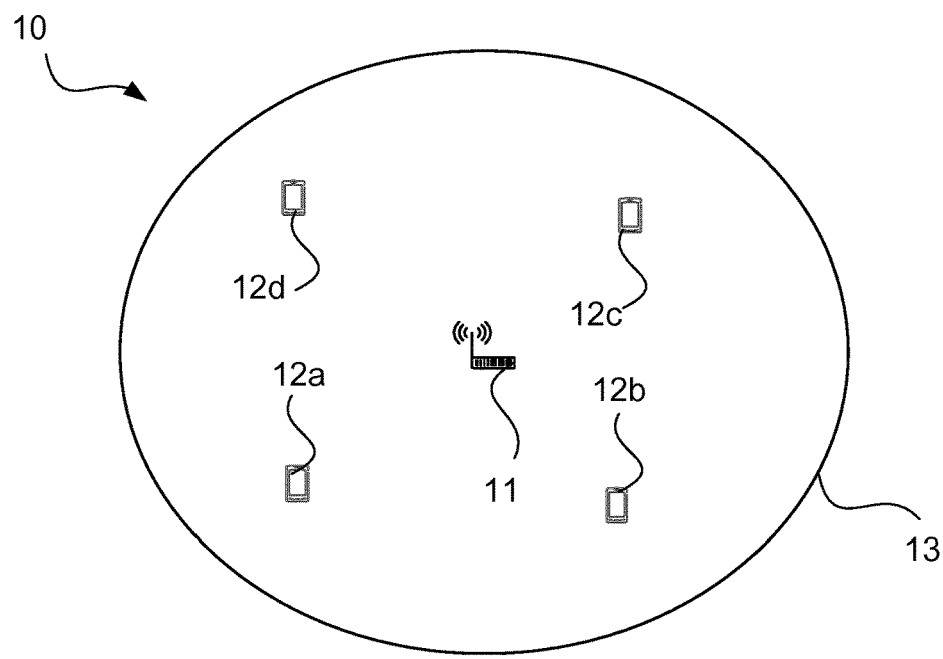
FIG. 1 is a schematic diagram illustrating a communication network according to embodiments.

FIG. 1 is a schematic diagram illustrating a communication network 10 where embodiments presented herein can be applied. The communication network 10 comprises a wireless network node 11. The wireless network node 11 may be a radio access network node, a radio base station, a base transceiver station, a node B, an evolved node B, or a wireless access point (AP). The wireless network node 11 provides network coverage to wireless devices 12a-d located within a coverage region 13 of the wireless network node 11. The wireless devices 12a-d may be any combination of mobile stations (STAs), mobile phones, handsets, wireless local loop phones, user equipment (UE), smartphones, laptop computers, and tablet computers.

Consider, as a non-limiting explanatory example, that the communications network 10 is using parameters similar to Wi-Fi, IEEE 802.11. Consider, as a non-limiting explanatory example, that the considered bandwidth is 20 MHz and that four wireless devices 12a-d are associated to one wireless network node 11, as illustrated in FIG. 1. Assume further that the 20 MHz channel consists of 56 sub-carriers; 52 sub-carriers carrying data (here numbered −28, . . . , 0, . . . , 28) and 4 sub-carriers representing known pilots in accordance with IEEE 802.11n.

Assume, as a non-limiting explanatory example, that time-division duplexing (TDD) is used, i.e., that the uplink (UL; the links from the wireless devices 12a-d towards the wireless network node 11) and the downlink (DL; the link from the wireless network node 11 towards the wireless devices 12a-d) are using the same channel, but not at the same time. Because of channel reciprocity, the channel will look the same in the DL and the UL. This channel reciprocity is usually true for the channels with low Doppler spread, as characterized by the channel models used for 802.11n, 802.11ac and beyond.

In FIG. 1 the four wireless devices 12a-d have roughly the same distance to the wireless network node 11 so that the distance dependent pathloss between each wireless device 12a-d and the wireless network node 11 may be assumed to be similar. Further, in terms of small scale fading, the frequency response for the four channels between the wireless network node 11 and the respective wireless device 12a-d may be assumed to be uncorrelated. That is to say, the channel between the wireless network node 11 and wireless device 12a is uncorrelated with the channel between the wireless network node 11 and wireless device 12b, etc.

Figure 17:
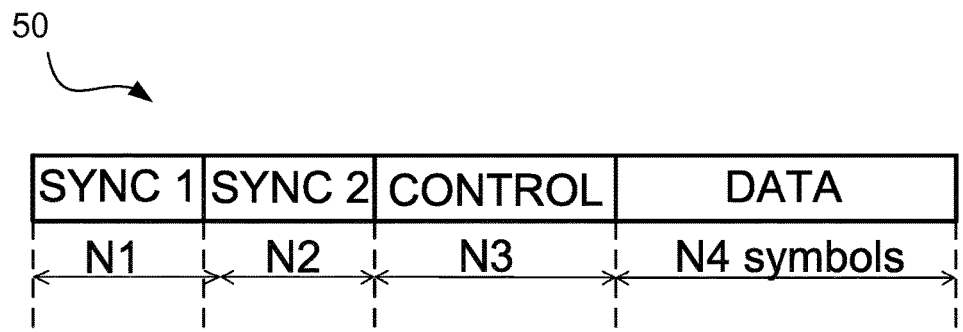
FIG. 17 is a schematic illustration of a second packet according to prior art.

Now suppose, as a non-limiting explanatory example, that the wireless network node 11 has data to send to only wireless device 12a and wireless device 12b. It is possible for the wireless network node 11 to send the data to one wireless device 12a-d at a time, for instance every other packet is sent to wireless device 12a and every other packet is sent to wireless device 12b. Moreover, suppose that the wireless network node 11 after having sent a packet to a wireless device 12a-d waits for an acknowledgement (ACK) and if no ACK is received, the wireless network node 11 retransmits the packet to the same wireless device 12a-d. In case the data packets sent to the wireless devices 12a-d are relatively small this will be rather inefficient because associated with every packet is typically a fixed overhead which is needed for different synchronization fields and to control signaling. This is schematically illustrated in FIG. 17, where a packet 50 representing such an ACK message transmitted from a wireless device 12a-d to the wireless network node 11 comprises a first sync field (SYNC 1) occupying N1 symbols, a second sync field (SYNC 2) occupying N2 symbols, a control field (CONTROL) occupying N3 symbols, and a data field (DATA) occupying N4 symbols. In addition, since there is a fixed turn-around time between reception and transmission, this also adds to the overall time the transmission takes.

Orthogonal Frequency-Division Multiple Access (OFDMA) may be used to reduce the overhead, and also reduce the number of turn-around times. OFDMA is currently not supported in the IEEE 802.11 standards, but may be supported in future releases. One way to implement OFDMA could be to allocate the lower frequency part of the channel to wireless device 12a and the upper frequency part of the channel to wireless device 12b, as illustrated in FIG. 2.

Figure 2:
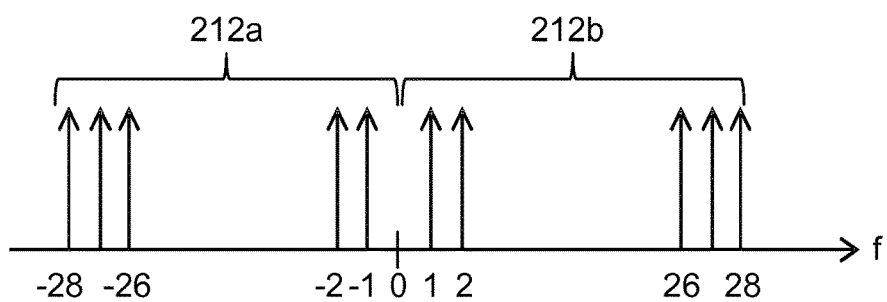
FIGS. 2 to 7 are schematic examples of sub-carrier allocations according to embodiments.

FIG. 2 provides a schematic illustration of how the 56 DL sub-carriers may be divided between wireless device 12a as indicated at reference numeral 212a and wireless device 12b as indicated at reference numeral 212b in case OFDMA is used in the DL.

Figure 3:
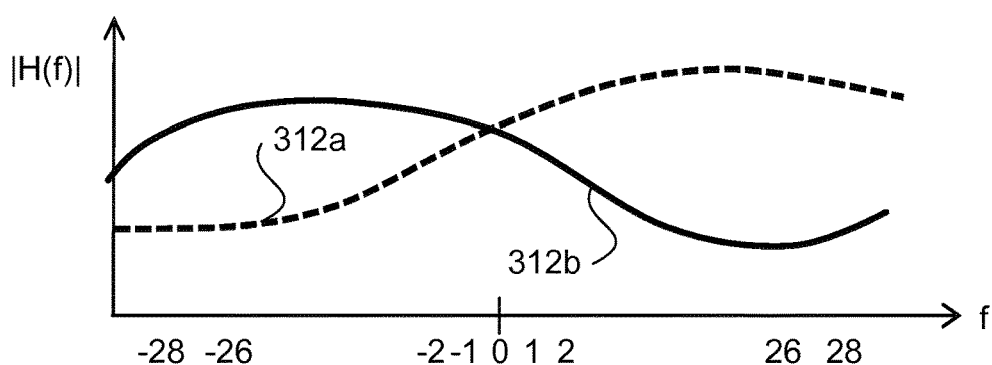

According to FIG. 2 the DL sub-carriers 212a, 212b are divided among the two wireless devices 12a 12b without taking any channel conditions into consideration. Suppose that the amplitude functions of the channels between the wireless network node 11 and wireless device 12a and wireless device 12b, respectively, have appearances as illustrated in FIG. 3. FIG. 3 provides a schematic illustration of the amplitude functions |H(f)| for the channel 312a between the wireless network node 11 and wireless device 12a (dashed) and the channel 312b between the wireless network node 11 and wireless device 12b (solid). As can be seen in FIG. 3, wireless device 12a is allocated to the frequency part of the channel where the channel conditions are less favorable for wireless device 12a, and it would have been preferable if wireless device 12a instead had been allocated to use the upper frequency part of the channel. In a similar fashion, wireless device 12b is allocated to the upper frequency part of the channel, where the channel for this wireless device 12b is less favorable. Thus, in this particular example, significantly better performance could have been achieved if instead the lower frequency part of the channel had been allocated to wireless device 12b and the upper frequency part of the channel had been allocated to wireless device 12a.

According to embodiments disclosed herein there is presented mechanisms for the wireless network node 11 to obtain channel information without having to explicitly sounding the channel. This may be achieved by ensuring that at least some part of the signal is transmitted to all wireless devices 12a-d covers the entire frequency channel and by determining proper allocation of the uplink sub-carriers for the wireless devices 12a-d. Some embodiments are based on the reciprocity of the channel, thus only applicable to the case the communication network 10 is based on time-division duplexing (TDD). However, some embodiments may also applicable to frequency-division duplexing (FDD).

The embodiments disclosed herein thus relate to frequency selective scheduling of wireless devices 12a-d in a communication network 10. In order to obtain such frequency selective scheduling there is provided a wireless network node 11, a method performed by the wireless network node 11, and a computer program comprising code, for example in the form of a computer program product, that when run on a processing unit of the wireless network node 11, causes the processing unit to perform the method. In order to obtain frequency selective scheduling there is further provided a wireless device 12a-d, a method performed by the wireless device 12a-d, and a computer program comprising code, for example in the form of a computer program product, that when run on a processing unit of the device 12a-d, causes the processing unit to perform the method.

FIG. 10a schematically illustrates, in terms of a number of functional units, the components of a wireless network node 11 according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 41a (as in FIG. 12), e.g. in the form of a storage medium 23. Thus the processing unit 21 is thereby arranged to execute methods as herein disclosed. The storage medium 23 may also comprise persistent storage, which, for example, can be any single one or combination of magnetic memory, optical memory, solid state memory or even remotely mounted memory. The wireless network node 11 may further comprise a communications interface 22 for communications with at least one wireless device 12a-d, another wireless network node, and a core network. As such the communications interface 22 may comprise one or more transmitters and receivers for wireless and wireline communications. The processing unit 21 controls the general operation of the wireless network node 11 e.g. by sending data and control signals to the communications interface 22 and the storage medium 23, by receiving data and reports from the communications interface 22, and by retrieving data and instructions from the storage medium 23. Other components, as well as the related functionality, of the wireless network node 11 are omitted in order not to obscure the concepts presented herein.

FIG. 10b schematically illustrates, in terms of a number of functional modules, the components of a wireless network node 11 according to an embodiment. The wireless network node 11 of FIG. 10b comprises a number of functional modules; a send and/or receive module 21a configured to perform below steps S102, S104, S110, and a determine module 21b configured to perform below step S106. The wireless network node 11 of FIG. 10b may further comprise a number of optional functional modules, such as any of an update module 21c configured to perform below steps S108a, S108b, and a combine module 21d configured to perform below step S104a. The functionality of each functional module 21a-d will be further disclosed below in the context of which the functional modules 21a-d may be used. In general terms, each functional module 21a-d may be implemented in hardware or in software. Preferably, one or more or all functional modules 21a-d may be implemented by the processing unit 21, possibly in cooperation with functional units 22 and/or 23. The processing unit 21 may thus be arranged to from the storage medium 23 fetch instructions as provided by a functional module 21a-d and to execute these instructions, thereby performing any steps as will be disclosed hereinafter.

FIG. 11a schematically illustrates, in terms of a number of functional units, the components of a wireless device 12a-d according to an embodiment. A processing unit 31 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 41b (as in FIG. 12), e.g. in the form of a storage medium 33. Thus the processing unit 31 is thereby arranged to execute methods as herein disclosed. The storage medium 33 may also comprise persistent storage, which, for example, can be any single one or combination of magnetic memory, optical memory, solid state memory or even remotely mounted memory. The wireless device 12a-d may further comprise a communications interface 32 for communications with a wireless network node 11 and optionally other devices such as another wireless device 12a-d. As such the communications interface 32 may comprise one or more transmitters and receivers for wireless communications and optionally one or more transmitters and receivers for wireline communications. The processing unit 31 controls the general operation of the wireless device 12a-d e.g. by sending data and control signals to the communications interface 32 and the storage medium 33, by receiving data and reports from the communications interface 32, and by retrieving data and instructions from the storage medium 33. Other components, as well as the related functionality, of the wireless device 12a-d are omitted in order not to obscure the concepts presented herein.

FIG. 11b schematically illustrates, in terms of a number of functional modules, the components of a wireless device 12a-d according to an embodiment. The wireless device 12a-d of FIG. 11b comprises a send and/or receive module 31a configured to perform below steps S202, S206, and S206a. The wireless device 12a-d of FIG. 11b may further comprises a number of optional functional modules, such as a determine module 31b configured to perform below step S204. The functionality of each functional module 31a-b will be further disclosed below in the context of which the functional modules 31a-b may be used. In general terms, each functional module 31a-b may be implemented in hardware or in software. Preferably, one or more or all functional modules 31a-b may be implemented by the processing unit 31, possibly in cooperation with functional units 32 and/or 33. The processing unit 31 may thus be arranged to from the storage medium 33 fetch instructions as provided by a functional module 31a-b and to execute these instructions, thereby performing any steps as will be disclosed hereinafter.

FIG. 12 shows one example of a computer program product 41a, 41b comprising computer readable means 43. On this computer readable means 33, a computer program 42a can be stored, which computer program 42a can cause the processing unit 21 and thereto operatively coupled entities and devices, such as the communications interface 22 and the storage medium 23, to execute methods according to embodiments described herein. The computer program 42a and/or computer program product 41a may thus provide means for performing any steps of the wireless network node 11 as herein disclosed. On this computer readable means 43, a computer program 42b can be stored, which computer program 42b can cause the processing unit 31 and thereto operatively coupled entities and devices, such as the communications interface 32 and the storage medium 33, to execute methods according to embodiments described herein. The computer program 42b and/or computer program product 41b may thus provide means for performing any steps of the wireless device 12a-d as herein disclosed.

In the example of FIG. 12, the computer program product 41a, 41b is illustrated as an optical disc, such as a CD (compact disc) or a DVD (digital versatile disc) or a Blu-Ray disc. The computer program product 41a, 41b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 42a, 42b is here schematically shown as a track on the depicted optical disk, the computer program 42a, 42b can be stored in any way which is suitable for the computer program product 41a, 41b.

Figure 13:
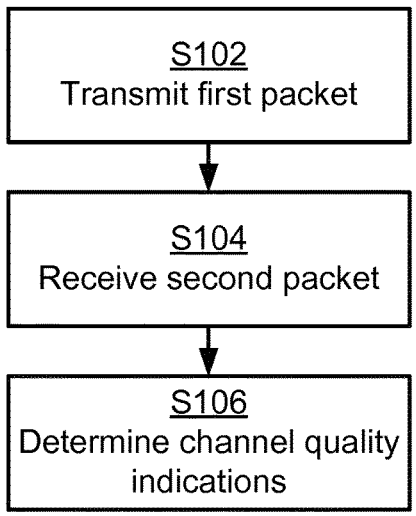
FIGS. 13, 14, 15, and 16 are flowcharts of methods according to embodiments.
Figure 14:
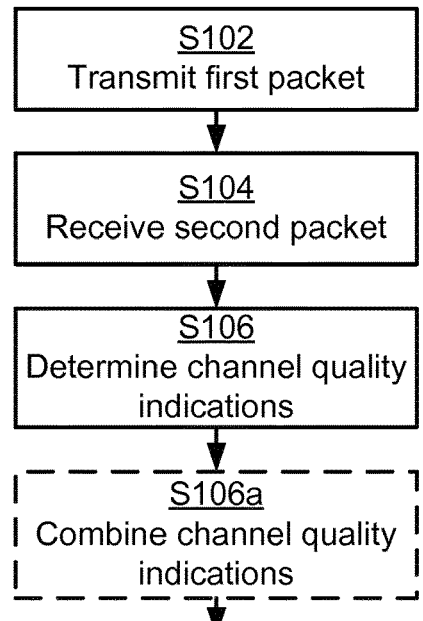
Figure 16:
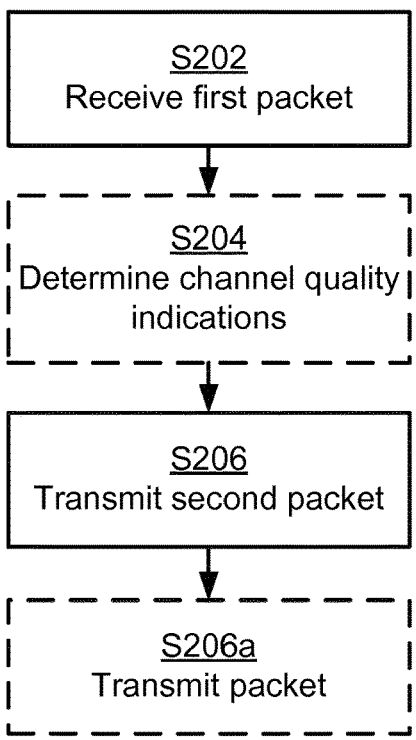
Figure 15:
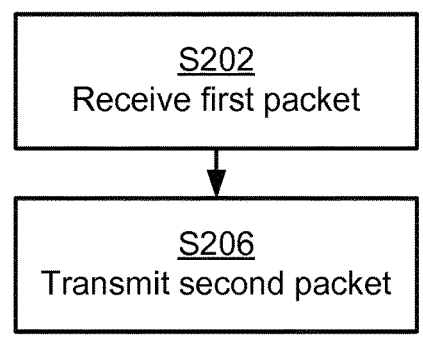

FIGS. 13 and 14 are flow charts illustrating embodiments of methods for frequency selective scheduling of wireless devices 12a-d in a communication network 10 as performed by the wireless network node 11. FIGS. 15 and 16 are flow charts illustrating embodiments of methods for enabling frequency selective scheduling of a wireless device 12a-d in a communication network 10 as performed by the wireless device 12a-d. The methods are advantageously provided as computer programs 42a, 42b.

In the above discussion it has at least implicitly been assumed that the same sub-carriers are used for both transmission to and reception from a specific wireless device (i.e., for both DL and UL, respectively). That is, the lower frequency part of the channel is used for both transmission from the wireless network node 11 to wireless device 12a (DL transmission) and from wireless device 12a to the wireless network node 11 (UL transmission).

Reference is now made to FIG. 13 illustrating a method for frequency selective scheduling of wireless devices 12a-d in a communication network 10 as performed by the wireless network node 11 according to an embodiment.

Since the two wireless devices 12a, 12b need to know what sub-carriers to use, it is envisioned that at least the first part of the transmitted packet is by the wireless network node 11 sent over the full bandwidth and received and decoded by all wireless devices 12*a-d*. The wireless network node 11 is therefore configured to, in a step S102, transmit a first packet to at least one wireless device(s) 12*a-d* over the entire available bandwidth of the communication network. The first packet comprises information identifying which wireless device(s) is/are addressed by the first packet, and which downlink sub-carriers are used for data transmission to the addressed wireless device(s).

That is, in addition to the fields of the first packet used for time-synchronization and parameter estimation, also a signaling (SIG) field containing control information regarding what wireless device(s) 12*a-d* is/are addressed and what sub-carries have been allocated to respective wireless device(s) 12*a-d* may be transmitted over the full bandwidth and decoded by all wireless devices 12*a-d*. Upon processing the SIG field, the different wireless devices 12*a-d* are able to determine if there is any data for them and also on what DL sub-carriers the corresponding actual data of the packet is transmitted. Thus, in the illustrative example above, wireless device 12*c* and wireless device 12*d* will process the packet until the SIG field has been decoded. Once wireless device 12*c* and wireless device 12*d* realize that there is no data for them in the packet they can stop the processing. Wireless device 12*a* and wireless device 12*b*, on the other hand, realize that there is data for them and also read out on what DL sub-carriers are transmitted. In this illustrative example, wireless device 12*a* is able to determine that it should process the lower (in frequency sense) 28 sub-carriers, whereas wireless device 12*b* is able to determine that it should process the upper (in frequency sense) 28 sub-carriers, as illustrated in FIG. 2.

As long as transmissions to wireless device 12*a* are performed using the lower frequency part of the channel, there is no chance to find out that the upper part of the band actually would have been preferred. On the other hand, if the lower frequency part of the channel allows for a decent communications link it is a risk that all of a sudden changing to another frequency part of the channel could actually degrade the communications performance. The wireless network node 11 is therefore configured to, in a step S104, receive (a second packet 50*a*, 50*b*, 50*c*, 50*d* (See, FIGS. 17, 18, 19, 20, the descriptions of which will follow below) on uplink sub-carriers allocated to at least the addressed wireless devices and therefrom to determine channel quality indications for the uplink sub-carriers. The uplink sub-carriers are allocated to enable the channel quality indications to be determined over the entire bandwidth for at least each one of the addressed wireless devices. Examples of such allocations will be provided below.

That is, in the DL all sub-carriers are used for the initial part of the first packet (such as synchronization and control), whereas the rest of the first packet (carrying data) is split among the wireless devices 12*a-d* by allocating different DL sub-carriers to different wireless devices 12*a-d*. For the UL, it may be assumed that only an ACK (and hence no actual user data) is sent from the wireless devices 12*a-d* in a second packet. In general terms, the ACK does not necessarily refer to a single bit, but to the second packet as such carrying this information. The information in the ACK packet may comprise information such as address to the wireless device transmitting the ACK, length indications, etc. This ACK is thus not using the same sub-carriers as the DL data, but is spread out between the wireless devices 12*a-d*. Mechanisms for evaluating possible allocation of DL and/or UL sub-carriers allocated to wireless devices 12*a-d* within the channel, but without risking that in fact the allocated DL and/or UL sub-carriers in new channel provides worse communications performance is described in the embodiments below.

Reference is now made to FIG. 14 illustrating methods for frequency selective scheduling of wireless devices 12*a-d* in a communication network 10 as performed by the wireless network node 11 according to further embodiments.

As noted above, the first packet sent by the wireless network node 11 may further comprises payload (user) data to at least one of the wireless devices addressed by the first packet.

The determined channel quality indications may aid the wireless network node to schedule the wireless devices in the uplink. Particularly, the wireless network node 11 may be configured to, in an optional step S108*a*, update which downlink sub-carriers to be used for data transmission to the addressed wireless devices based on the determined channel quality indications.

Once the wireless network node 11 has updated the what sub-carriers will be used for data transmission to the different wireless devices 12*a-d*, information of this may be sent either implicitly or explicitly to the wireless devices 12*a-d*. Hence, the wireless network node 11 may be configured to, in an optional step S110, transmit an acknowledgement message to the wireless devices. The acknowledgement message comprises information about the updating. The information may identify which uplink sub-carriers at least the addressed wireless devices are to use for transmission to the wireless network node 11.

Figure 4:
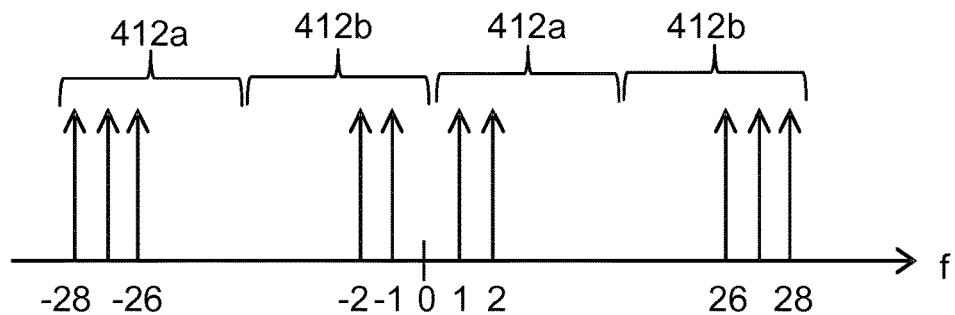

In a first embodiment of the present invention, the data to be transmitted to two or more wireless devices 12*a-d* are allocated to different sets of DL sub-carriers, for instance as illustrated in FIG. 2. However, rather than using the same set (or same allocation) of sub-carriers for corresponding UL transmission where an ACK is sent from at least the wireless devices 12*a-d* addressed by the DL transmission to the wireless network node 11, the ACK is sent using a distributed set of UL sub-carriers. The distributed set of UL sub-carriers in the UL transmission is selected such that also at least one other part of the frequency channel is used (compared to the DL sub-carriers used for data transmission to the wireless devices 12*a-d*). An illustrative example is illustrated in FIG. 4. FIG. 4 provides an exemplary illustration of how the different UL sub-carriers 412*a*, 412*b* may be allocated to different wireless devices 12*a-d* according to the first embodiment.

The uplink sub-carriers may be determined based on positions of the downlink sub-carriers. Referring to FIG. 4, the ACK from wireless device 12*a* at UL sub-carriers 412*a* is interleaved with the ACK from wireless device 12*b* at UL sub-carriers 412*b*, and these two ACKs may be transmitted simultaneously. Upon reception of the ACKs from wireless device 12*a* and wireless device 12*b*, the wireless network node 11 may then directly estimate the channel quality on the UL sub-carriers used by the wireless devices 12*a-b*.

Further, the wireless network node 11 may interpolate and/or extrapolate the estimated channel quality on these UL sub-carriers so as to obtain a channel estimate for the entire channel bandwidth. That is, the step of determining the channel quality indications for the uplink sub-carriers may involve interpolating and/or extrapolating channel quality indications for at least two uplink sub-carriers.

Figure 5:
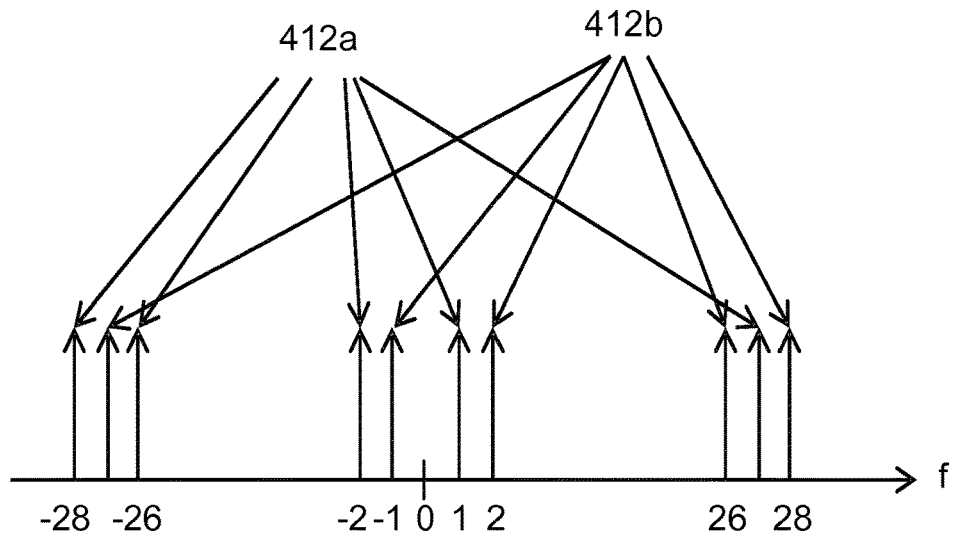

In FIG. 4, the UL sub-carriers for each wireless device 12*a-b* are divided into two different groups. Alternatively, the sub-carriers may be divided into a larger number of groups, or could even be sent on isolated UL sub-carriers, as shown in FIG. 5. FIG. 5 provides an illustration of how the different UL sub-carriers 412*a*, 412*b* may be allocated to different wireless devices 12a-d according to the first embodiment, where wireless device 12a is allocated UL sub-carriers 412a, and wireless device 12b is allocated UL sub-carriers 412b.

A pattern that is agreed by the wireless network node 11 and all wireless devices 12a-d may be used to distribute UL sub-carriers across the bandwidth. Hence, the uplink sub-carriers may be determined based on an uplink scheduling pattern.

The pattern may be an interleaving pattern. For example, the uplink sub-carriers for each one of the wireless devices 12a-d may be determined to be frequency interleaved. In more detail, the uplink sub-carriers may be interleaved such that uplink sub-carriers in each pair of uplink sub-carriers for one of the wireless devices 12a are frequency separated by at least one uplink sub-carrier of another one of the wireless devices 12b-d.

For example, the sub-carriers for each one of the wireless devices 12a-d may be determined such that different sub-carriers are used for different orthogonal frequency division multiplexing (OFDM) symbols, and such that all sub-carriers are used by all wireless devices 12a-d during at least one OFDM symbol. Particularly, the sub-carriers allocated to a specific wireless device 12a-d may be determined such that in the last one of the OFDM symbols used for channel estimation, the sub-carriers allocated for channel estimation are the same sub-carriers as those sub-carriers allocated for data in the subsequent OFDM symbols to the same wireless device 12a-d.

At the wireless network node side, if needed, the wireless network node 11 may thus de-interleave the UL subcarriers such that the wireless network node 11 is able to process ACKs, or other information, received from different wireless devices 12a-d in exactly the same way as if no interleaving had taken place.

The pattern may be a fixed pattern known to both the wireless network node 11 and the wireless devices 12a-d. One advantage of such known patterns is that it does not require any signaling overhead to indicate how the UL sub-carriers are to be allocated among the wireless devices 12a-d.

One way to determine such a pattern is to have a fixed pattern for N wireless devices 12a-d, where N=2, 3, 4, . . . . As an example, in case N=2 the fixed pattern could be determined such that every other UL sub-carrier is allocated to wireless device 12a and every other sub-carrier is allocated to wireless device 12b, starting with wireless device 12a at the UL sub-carrier at the lowest frequency. Thus if N=3, in a similar way, every third UL sub-carrier may be allocated to wireless device 12a, wireless device 12b, and wireless device 12c. Such a pattern may be easily generalized to all interesting values of N. It is envisioned that at least 10-12 UL sub-carriers may be allocated to each wireless device 12a-d, so reasonable values of N is 2-5 in case of a 20 MHz bandwidth, as used in the illustrative example above.

According to the first embodiment, the signals transmitted from the wireless devices 12a-d to the wireless network node 11 may thus be regarded as interleaved. However, the first embodiment is not restricted to exactly what information is transmitted on the UL sub-carriers. According to the above it is the ACK of the corresponding first packet that is transmitted on the UL sub-carriers. However, this does not imply that only an ACK is transmitted on the UL sub-carriers, but the signal on the UL sub-carriers may additionally or alternatively include known pilots, or some robustly modulated control data. It should also be understood that in case the corresponding first packet from the wireless network node 11 to the wireless device 12a-d is not correctly received at the wireless device 12a-d, instead of an ACK, an explicit negative acknowledgement (NACK) or an implicit NACK (i.e., absences of an ACK) may be sent together with e.g. control and pilots. In the latter case, some of the UL sub-carriers may not be occupied.

In the first embodiment, the channel estimation is performed in the wireless network node 11 for the purpose of frequency selective scheduling in the DL. At least two desirable properties are achieved by this. The first property is that the complexity needed for performing the channel estimation is provided in the wireless network node 11, which anyway takes the scheduling decision. The second property is that the channel estimation may be performed just before the DL scheduling takes place, which means that the channel estimate may be as up-to-date as it possibly can be. The latter property may be of particular importance if there are (fast) channel variations. However, as discussed above it is envisioned that the initial part of the DL first packet may be intended for all wireless devices 12a-d and will be used for initial synchronization and parameters estimation. This is explored in a second embodiment.

In a second embodiment, the wireless devices 12a-d are configured to estimate the channel over the entire available bandwidth; also the parts of the bandwidth where the wireless devices 12a-d will not receive data. The wireless devices 12a-d may then report this channel information back to the wireless network node 11 in the following ACK (second packet). Hence, the downlink channel quality indications may represent downlink channel quality indications of the entire bandwidth as determined by each one of the wireless devices 12a-d. Preferably, explicit NACK may be used such that an ACK/NACK (second packet) is sent even if the DL data is not correctly received. However, the second embodiment is applicable also if feedback reports sometimes would be absent from some wireless devices 12a-d. The downlink channel quality indications of the entire bandwidth may be provided for sets of downlink sub-carriers, wherein each set comprises at least one downlink sub-carrier and at most all downlink sub-carriers.

There are different types of feedback information that could be provided from the wireless devices 12a-d to the wireless network node 11. For example, suppose that the granularity in frequency for the feedback report would be, say, 5 MHz, i.e., the channel is estimated in 5 MHz chunks, and that the corresponding quality determined. Also, suppose for simplicity, and without limitation, that the total bandwidth is 20 MHz. Thus, there are in total 20/5=4 channels that are available for OFDMA. Generalizations to larger bandwidths are trivial.

The downlink channel quality indications may be provided as a vector indicating individual downlink channel quality indications for each set of downlink sub-carriers, an ordered list of the sets of downlink sub-carriers, and/or a list comprising estimated modulation and coding schemes for each set of downlink sub-carriers. For example, for the present example with four segments of DL sub-carriers allocated to each wireless device 12a-d the feedback information could then be provided as a four bit long vector indicating which ones of the four segments fulfill some channel quality criterion. Another possible way to provide the feedback information is for the wireless devices 12a-d to send an ordered list of the preferred 5 MHz channels, e.g. starting with the best channel and ending with the least favorable (in terms of estimated channel quality). Yet another type of feedback information could be represented by a list comprising an estimated modulation and coding scheme (MCS) that could be used for respective OFDMA channels.

Figure 6:
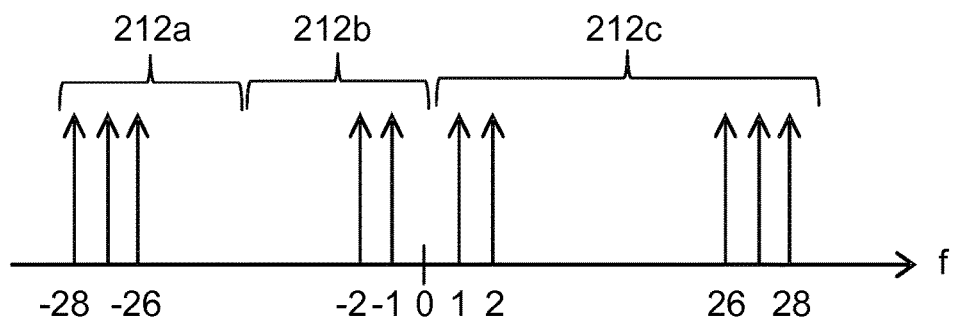

In a third embodiment, the second embodiment is extended such that also wireless devices 12c-d that will not receive any data in the first packet transmitted by the wireless network node 11 is requested, either explicitly or implicitly, to perform measurements and to report back the measurements to the wireless network node 11 on the UL sub-carriers. That is, downlink channel quality indications for the downlink sub-carriers may be acquired from wireless devices not being addressed. As an example, suppose that wireless device 12a, wireless device 12b, and wireless device 12c all are involved in an ongoing data transfer using frequency selective scheduling according to the second embodiment, and suppose that, in terms of DL sub-carriers, wireless device 12a is allocated to the lower-most 5 MHz, wireless device 12b to the middle 10 MHz, and wireless device 3 to the upper-most 10 MHz, as illustrated in FIG. 6. FIG. 6 provides an example of DL sub-carrier allocation in case of transmission to wireless devices 12a-c, where wireless device 12a is allocated DL sub-carriers 212a, wireless device 12b is allocated DL sub-carriers 212b, and where wireless device 12c is allocated DL sub-carriers 212c.

Figure 7:
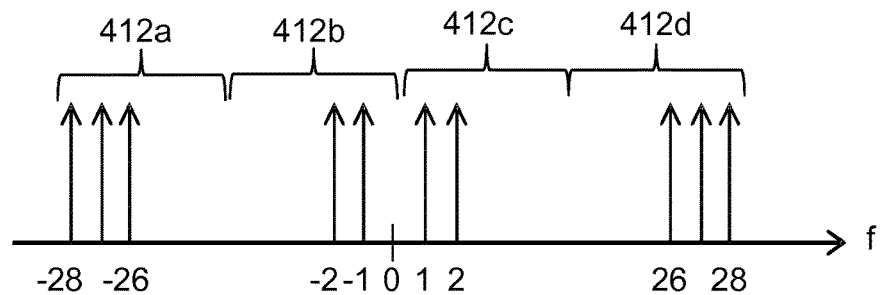

The wireless network node 11 may then obtain DL data intended for wireless device 12d. Because wireless device 12d according to the illustrative example is currently not communicating with the wireless network node 11, the wireless network node 11 has no knowledge of what would be a suitable 5 MHz channel to allocate for DL sub-carriers to wireless device 12d (assuming that the DL sub-carriers for wireless 12d are to be allocated in a 5 MHz wide channel). To obtain this knowledge concerning the channel between the wireless network node 11 and wireless device 12d, a control data field (SIG field) in the first packet sent over the entire available bandwidth is extended so in addition to notifying what wireless devices 12a-b will have data in the following first packet, wireless devices 12c-d not received data may still be requested to perform measurements and report back in a corresponding ACK/NACK (second packet) to the wireless network node 11. As an example, although there is no data to, say, wireless device 12d in the current first packet, wireless device 12d may still be requested to perform channel estimation. As this implies that the UL sub-carriers have to be shared among the different wireless devices 12a-d differently, the sub-carrier allocation used for the UL may be explicitly indicated in the SIG field. As an example, using the DL allocation of sub-carriers shown in FIG. 6, one corresponding UL sub-carrier allocation is shown in FIG. 7. FIG. 7 provides an example of UL sub-carrier allocation in case of UL transmission from four wireless devices 12a-d, where wireless device 12a is allocated UL sub-carriers 412a, wireless device 12b is allocated UL sub-carriers 412b, wireless device 12c is allocated UL sub-carriers 412c, and where wireless device 12d is allocated UL sub-carriers 412d.

In at least the first embodiment, the channel estimation is performed in the wireless network node 11 for the purpose of frequency selective scheduling in the DL. In case there is little or no DL transmissions in the DL, the channel estimation needed for the frequency selective scheduling may be achieved by occasionally sending a first packet in the DL for the mere purpose of channel estimation, i.e., once in a while channel sounding may be used. However, this may only be a feasible alternative when the channel is not changing too fast, as otherwise the fraction of sounding packets will be (too) large. A mechanism to avoid the use of sounding packets in case of UL intensive traffic is disclosed in the following fourth embodiment.

In a fourth embodiment, which may be particularly suitable for heavy UL traffic, the UL traffic is sent localized, e.g., as illustrated in FIG. 7. That is, the uplink sub-carriers may be determined such that the uplink sub-carriers for the wireless devices 12a-d are provided in distinct frequency subbands, wherein each frequency subband corresponds to one of the wireless devices 12a-d. The corresponding DL ACK is sent at least partly using the full bandwidth. For instance, the synchronization fields and the SIG field in the first packet sent by the wireless network node 11 may be over the full bandwidth and the specific ACKs (or data) to the individual wireless devices 12a-d may be sent on different sets of DL sub-carriers. Alternatively the ACKs could be staggered in time and sent on all DL sub-carriers to all the wireless devices 12a-d. In any event, this allows the wireless devices 12a-d to estimate the channel over the full bandwidth and determine which parts of the channel are most suitable (according to some performance criterion, see above). This information is then sent to the wireless network node 11, e.g. using some of the mechanisms described in the second embodiment. In this fourth embodiment, the channel state information is thus sent in the first packet carrying the data, rather than in the second packet carrying the ACK/NACK as was the case in the second embodiment.

Upon reception of the information from the different wireless devices 12a-d, the wireless network node 11 may combines the information about the different channels and then determine where to schedule respective wireless device 12a-d. Particularly, the wireless network node 11 may be configured to, in an optional step S104a, determine channel quality indications for uplink sub-carriers for at least the addressed wireless devices by combining channel quality indications of at least two of the distinct frequency subbands. This scheduling decision may then be sent in a DL ACK message and the proper UL sub-carrier allocation may then be used by the wireless devices 12a-d in subsequent UL data transmissions.

Figure 8:
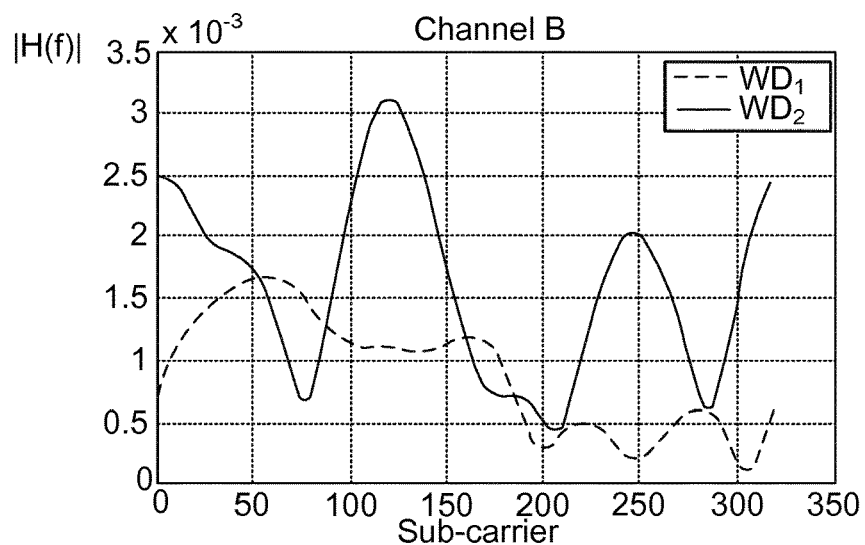
FIGS. 8 and 9 schematically illustrates varying channel conditions for sub-carriers.
Figure 9:
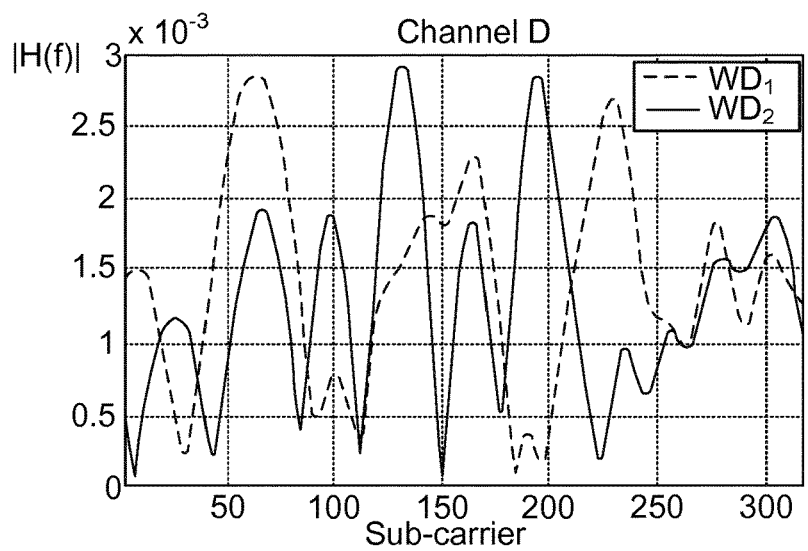

In a fifth embodiment, applicable at least to the first embodiment, the pattern is made dependent on the estimated delay spread of the channel. Particularly, the wireless network node 11 may be configured to, in an optional step S106, determine downlink channel quality indications for the downlink sub-carriers at least for the addressed wireless devices. The wireless network node 11 may then be configured to, in an optional step S108b, update which downlink sub-carriers to be used for data transmission to the addressed wireless devices based on the acquired downlink channel quality indications. In more detail, as a communication network 10 may experience varying channel conditions, the patter may be made dependent on how frequency selective the channel is, i.e., how much the channel is varying as a function of frequency. Referring to FIGS. 8 and 9 illustrating |H(f)| as a function of sub-carriers for two channels denoted "Channel B" and "Channel D", respectively, for two wireless devices denoted WD1 and WD2, respectively, the channel in FIG. 8 may be estimated on a coarser grid than the channel in FIG. 9. In more detail, FIGS. 8 and 9 provide two examples of amplitude functions (as represented by |H(f)|) of the communications links between the wireless network node 11 and wireless device 12a (WD1) and wireless device 12b (WD2), respectively. The example of FIG. 8 corresponds to a channel with small delay spread and the example of FIG. 9 corresponds to a channel with somewhat larger delay spread. FIG. 8 corresponds to an indoor channel with relatively small delay spread, which is representative for a rather small room and a relatively small distance. For both FIGS. 8 and 9 the x-axis is graded in sub-carrier number where the frequency distance between two sub-carriers is 312.5 kHz, so that the total bandwidth shown corresponds to 100 MHz. As can be seen the frequency variations are quite different between these two figures, i.e., the channel in FIG. 9 is considerably more frequency selective than the channel in FIG. 8.

In a sixth embodiment, applicable to all of the above embodiments, the granularity of the frequency sub-bands possible to allocate to sub-carriers of different wireless devices 12*a-d* is made dependent on the expected delay spread of the channel. That is, how many downlink sub-carriers for each one of the wireless devices to be pairwise adjoining may depend on the determined channel quality indications for the uplink sub-carriers. Specifically, in case of relatively small delay spread when the channel is less frequency selective, the frequency sub-bands are made wider to reduce the overhead needed in channel estimation and the corresponding reports, whereas when the channel has large delay spread, smaller frequency sub-bands are used to make the frequency selective scheduling more efficient and being able to avoid parts of the frequency band that is in a deep fading dip.

In a seventh embodiment, the above disclosed embodiments are applied to multi-user multiple input multiple output (MU-MIMO) communications, so that more than one channel between the wireless network node 11 and respective wireless device 12*a-d* are estimated. That is, at least one of the downlink sub-carriers and the uplink sub-carriers may define at least two channels between the wireless network node 11 and at least one of the wireless devices 12*a-d*. Further, at least one of the downlink sub-carriers and the uplink sub-carriers may define at least two channels between the wireless network node 11 and at least two of the wireless devices 12*a-d*. Also for the seventh embodiment one purpose is to reduce the amount of packets needed for sounding.

In an eight embodiment, the pattern is only applied to a subset of the OFDM symbols carrying pilots. The remaining subset of OFDM symbols is used for channel estimation to decode the ACK (second packet). Thus, the uplink scheduling pattern may exclude at least one uplink sub-carrier. With this embodiment it is possible to transmit the ACKs in the UL in the same frequency sub-band as the downlink data. This may be advantageous since the same UL and DL sub-carriers are used for a particular wireless device 12*a-d*, causing less imbalance between the UL and the DL. This embodiment may require at least two OFDM symbols with pilots and this is the case for the legacy LTF field in the 802.11 preamble.

Reference is now made to FIG. 15 illustrating a method for enabling frequency selective scheduling of a wireless device 12*a-d* in a communication network 10 as performed by the wireless device 12*a-d* according to an embodiment.

As noted above, the wireless network node 11 in a step S102 transmits a first packet. The wireless device 12*a-d* is therefore configured to, in a step S202, receive such a first packet 50*a*, 50*b*, 50*c*, 50*d* from a wireless network node 11. As noted above, the first packet has been sent over the entire available bandwidth of the communication network 10 and comprises information identifying which wireless devices are addressed by the first packet, and which downlink sub-carriers are used for data transmission to the addressed wireless devices.

The wireless device 12*a-d* sends a response to this first packet. The response may be sent in the form of an ACK. Particularly, the wireless device 12*a-d* is configured to, in a step S206, transmit a second packet to the wireless network node 11 on uplink sub-carriers. The uplink sub-carriers are allocated to enable channel quality indications to be determined over the entire bandwidth for the wireless device 12*a-d*. This enables the wireless device 12*a-d* to be frequency selectively scheduled.

Embodiments relating to further details of enabling frequency selective scheduling of a wireless device 12*a-d* in a communication network 10 will now be disclosed.

Receiving the first packet may comprise processing the entire bandwidth of the communication network. Particularly, for the initial part of the first packet the entire bandwidth may be processed for the wireless device 12*a-d* to synchronize and read out the control information regarding where the data is located, and then to process the part of the bandwidth where the data is located.

Reference is now made to FIG. 16 illustrating methods for enabling frequency selective scheduling of a wireless device 12*a-d* in a communication network 10 as performed by the wireless device 12*a-d* according to further embodiments.

As noted above, the wireless device 12*a-d* may perform channel quality indications measurements. Particularly, the wireless device 12*a-d* may be configured to, in an optional step S204, determine channel quality indications at least for said uplink sub-carriers, at least in case the wireless device 12*a-d* has been identified addressed. The wireless device 12*a-d* may then be configured to, in an optional step S206*a*, transmit the channel quality indications to the wireless network node 11 in the second packet (i.e., the second packet transmitted in step S206).

Figure 18:
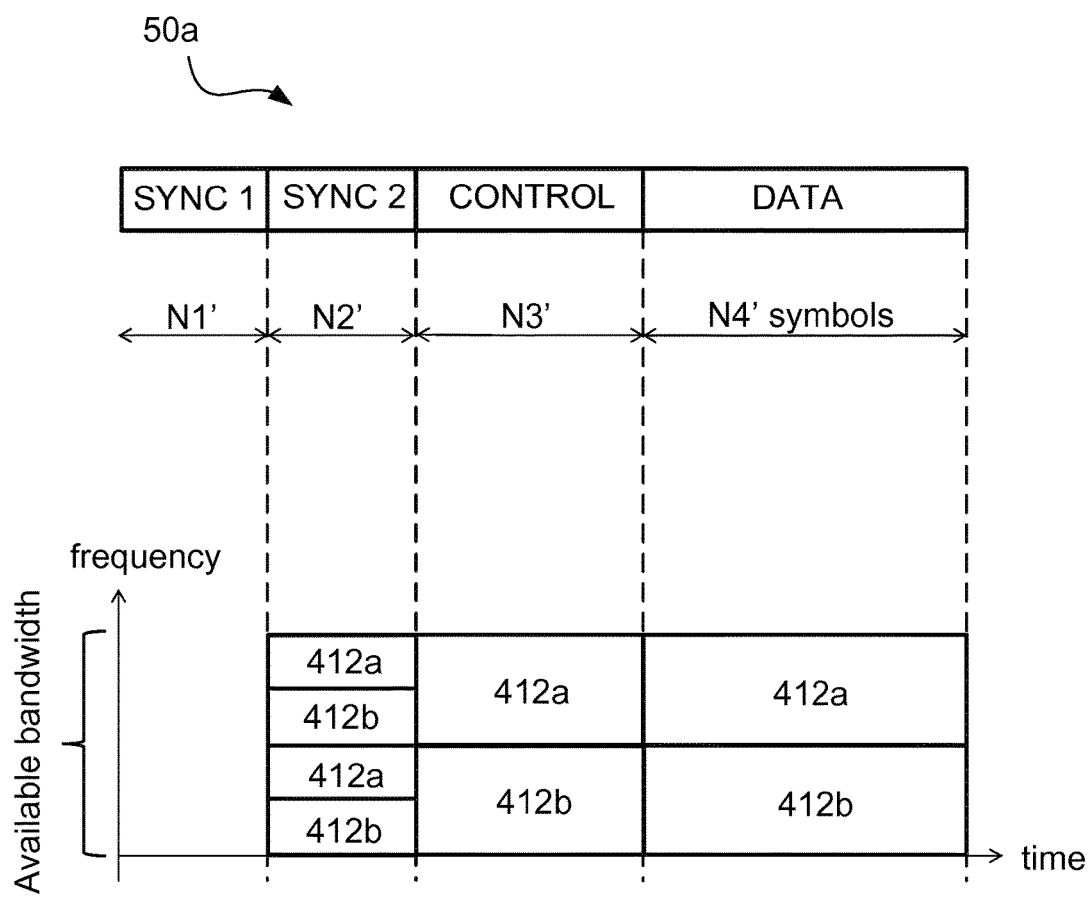
FIGS. 18, 19, 20, and 21 are schematic illustrations of second packets according to embodiments.

FIG. 18 schematically illustrates a second packet 50*a* as transmitted from the wireless devices 12*a*, 12*b* in step S202 and as received by the wireless network node 11 in step S104. The second packet 50*a* comprises a first sync field (SYNC 1) occupying N1' symbols, a second sync field (SYNC 2) occupying N2' symbols, a control field (CONTROL) occupying N3' symbols, and a data field (DATA) occupying N4' symbols. According to the packet 50*a*, part of the sync (the second sync field) is interleaved between the wireless devices 12*a* and 12*b* according to the UL sub-carriers 412*a* and 412*b*, respectively, but control information and data is sent using the same sub-carriers as in DL.

Figure 19:
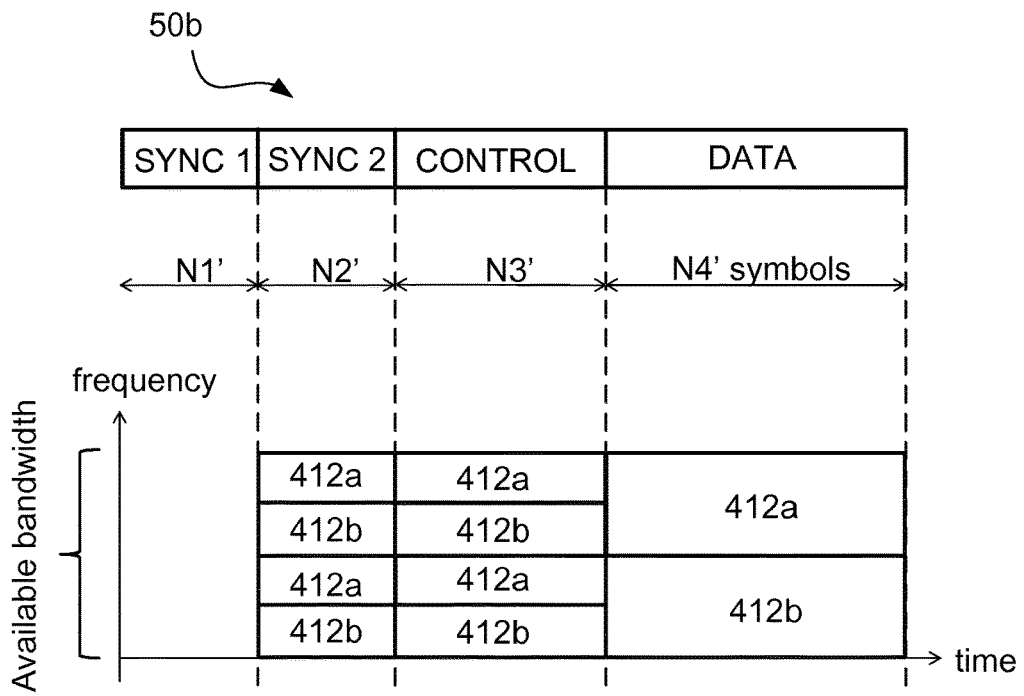

FIG. 19 schematically illustrates a second packet 50*b* as transmitted from the wireless devices 12*a*, 12*b* in step S202 and as received by the wireless network node 11 in step S104. The second packet 50*b* comprises a first sync field is (SYNC 1) occupying N1' symbols, a second sync field (SYNC 2) occupying N2' symbols, a control field (CONTROL) occupying N3' symbols, and a data field (DATA) occupying N4' symbols. According to the packet 50*b*, part of the sync (the second sync field) as well as control is interleaved between the wireless devices 12*a* and 12*b* according to the UL sub-carriers 412*a* and 412*b*, respectively, but data is sent using the same sub-carriers as in DL.

Figure 20:
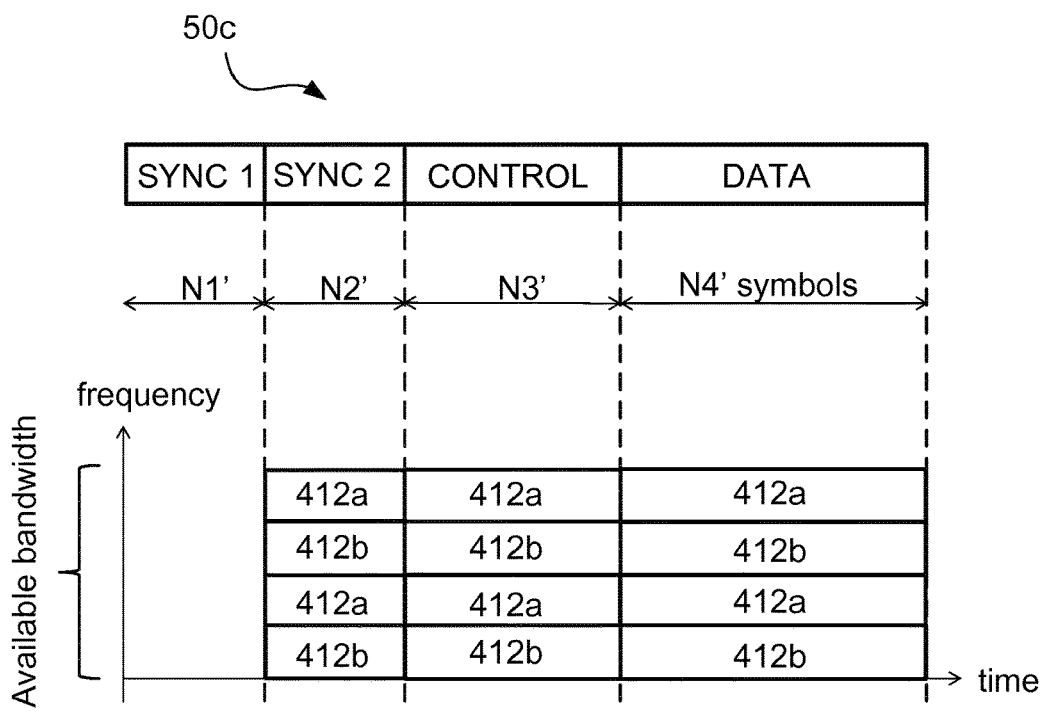

FIG. 20 schematically illustrates a second packet 50*c* as transmitted from the wireless devices 12*a*, 12*b* in step S202 and as received by the wireless network node 11 in step S104. The second packet 50*c* comprises a first sync field (SYNC 1) occupying N1' symbols, a second sync field (SYNC 2) occupying N2' symbols, a control field (CONTROL) occupying N3' symbols, and a data field (DATA) occupying N4' symbols. According to the packet 50*c*, part of the sync (the second sync field), the control information as well as data are interleaved between the wireless devices 12*a* and 12*b* according to the UL sub-carriers 412*a* and 412*b*, respectively.

Figure 21:
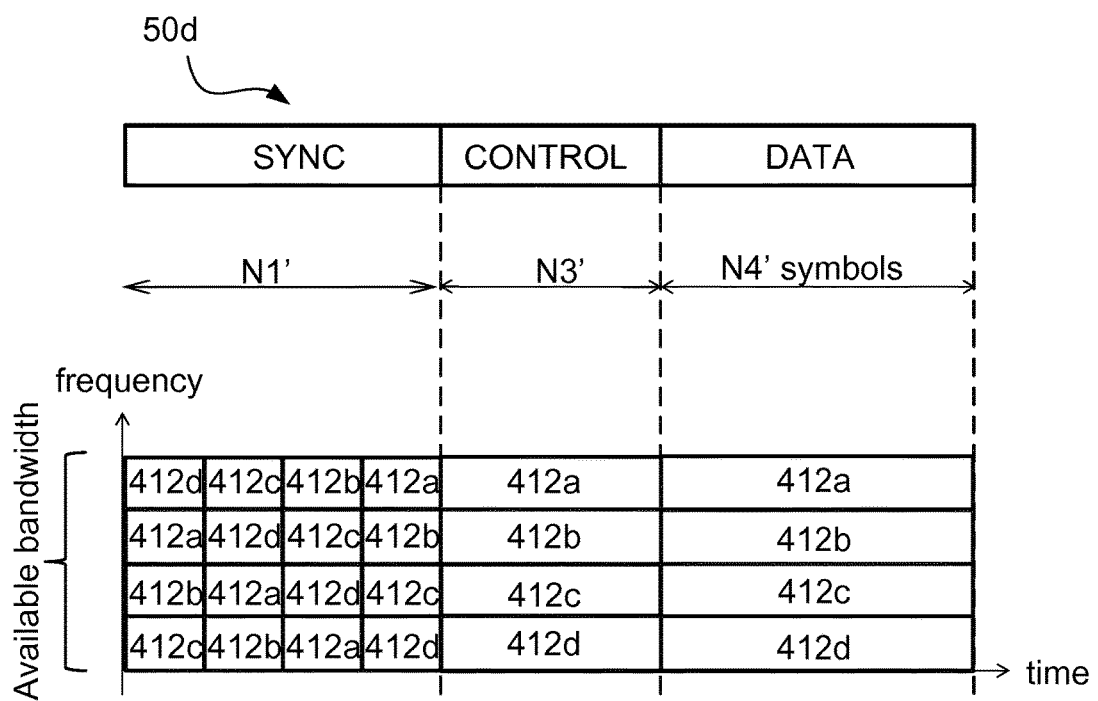

FIG. 21 schematically illustrates a second packet 50d as transmitted from the wireless devices 12a, 12b in step S202 and as received by the wireless network node 11 in step S104. The second packet 50a comprises a sync field (SYNC) occupying N1' symbols, a control field (CONTROL) occupying N3' symbols, and a data field (DATA) occupying N4' symbols. According to the packet 50d, the sync field is used for estimating the channel quality for all wireless devices 12a-d for the entire available bandwidth by using different UL sub-carriers 412a-d for different wireless devices 12a-d in different symbols. In the symbols of the control field, the same sub-carriers are allocated as for the remaining part of the packet where the data is located to improve accuracy of the channel estimate for the demodulation.

In view of the above disclosure, at least some of the herein disclosed embodiments may be summarized as representing a method for achieving frequency selective scheduling in a communication network 10 employing OFDMA, where no explicit sounding is required, but that part of the multi-user transmission is over the entire available bandwidth and that this part of the transmission is used for estimation of the channel where also no data for a specific wireless device 12a-d is transmitted.

The frequency selective scheduling may be for DL transmission and the estimation of the channels for the different wireless devices 12a-d may be performed in the wireless network node 11. This may be enabled by the UL signals from the wireless device being sent in an interleaved fashion.

The frequency selective scheduling may be for DL transmission and the estimation of the channel for the different wireless devices 12a-d may be performed in respective wireless devices 12a-d and the respective estimate may be sent to the wireless network node 11, where the wireless network node 11 uses these estimated to determine how to determine the frequency selective scheduling.

The frequency selective scheduling may be for UL transmission and the estimation of the channel for the different wireless devices 12a-d may be performed in respective wireless device 12a-d and the respective estimate may be sent to the wireless network node 11 where the wireless network node 11 uses these estimates to determine how to determine the frequency selective scheduling.

The pattern may be predetermined for each wireless device 12a-d and may depend on the total number of wireless devices 12a-d served by the wireless network node 11.

The pattern may be dependent on the estimated delay spread of the channel.

The granularity (i.e., the minimum number of adjacent sub-carriers allocated to the same wireless device 12a-d) may be dependent on the estimated delay spread of the channel.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For example, although at least some of the herein disclosed embodiments have been described in relation to a wireless local area network (WLAN) system, where the wireless network node is referred to as an access point (AP) and the wireless device is referred to as a station (STA), this is merely to ease the description. However, as is understood by the skilled person, the herein disclosed embodiments are as such applicable also to other standards and communication systems.

The invention claimed is:

1. A method for frequency selective scheduling of wireless devices in a communication network, the method being performed by a wireless network node, comprising the steps of:
transmitting a first packet to at least one wireless device over the entire available bandwidth of the communication network, wherein said first packet comprises information identifying which wireless devices are addressed by the first packet, and which downlink sub-carriers are used for data transmission to said addressed wireless devices; and
receiving a second packet on uplink sub-carriers allocated to at least said addressed wireless devices and therefrom determining channel quality indications for said uplink sub-carriers, wherein said uplink sub-carriers are allocated to enable said channel quality indications to be determined over said entire bandwidth for at least each one of said addressed wireless devices by at least one of interpolating and extrapolating channel quality indications for at least two uplink sub-carriers, and wherein said uplink sub-carriers for each one of said wireless devices are determined to be frequency interleaved.

2. The method according to claim 1, further comprising:
updating which downlink sub-carriers to be used for data transmission to said addressed wireless devices based on said determined channel quality indications.

3. The method according to claim 2, further comprising:
transmitting an acknowledgement message to said at least one wireless device, said acknowledgement message comprising information about said updating.

4. The method according to claim 1, wherein said first packet further comprises payload data to at least one of said wireless devices addressed by the first packet.

5. The method according to claim 1, wherein said uplink sub-carriers are interleaved such that uplink sub-carriers in each pair of uplink sub-carriers for one of said wireless devices are frequency separated by at least one uplink sub-carrier of another one of said wireless devices.

6. The method according to claim 1, wherein said uplink sub-carriers for each one of said wireless devices are determined such that different sub-carriers are used for different orthogonal frequency division multiplexing, OFDM, symbols, and such that all sub-carriers are used by all said wireless devices during at least one OFDM symbol.

7. The method according to claim 6, wherein the sub-carriers allocated to a specific wireless device are selected such that in the last one of the OFDM symbols used for channel estimation, the sub-carriers allocated for channel estimation are the same sub-carriers as those sub-carriers allocated for data in the subsequent OFDM symbols to the same wireless device.

8. The method according to claim 1, wherein said information further identifies which uplink sub-carriers at least said addressed wireless devices are to use for transmission to the wireless network node.

9. The method according to claim 1, wherein said uplink sub-carriers are determined based on positions of said downlink sub-carriers.

10. The method according to claim 1, wherein said uplink sub-carriers are determined based on an uplink scheduling pattern.

11. The method according to claim 10, wherein said uplink scheduling pattern excludes at least one uplink sub-carrier.

12. The method according to claim 1, further comprising:
determining downlink channel quality indications for said downlink sub-carriers at least for said addressed wireless devices,
updating which downlink sub-carriers to be used for data transmission to said addressed wireless devices based on said acquired downlink channel quality indications.

13. The method according to claim 12, wherein said downlink channel quality indications represent downlink channel quality indications of said entire bandwidth as determined by each one of said wireless devices.

14. The method according to claim 13, wherein said downlink channel quality indications of said entire bandwidth are provided for sets of downlink sub-carriers, wherein each set comprises at least one downlink sub-carrier and at most all downlink sub-carriers.

15. The method according to claim 14, wherein said downlink channel quality indications are provided as one of a vector indicating individual downlink channel quality indications for each set of downlink sub-carriers, an ordered list of the sets of downlink sub-carriers, and a list comprising estimated modulation and coding schemes for each set of downlink sub-carriers.

16. The method according to claim 12, wherein said downlink channel quality indications for said downlink sub-carriers are acquired from wireless devices not being addressed.

17. The method according to claim 1, wherein said uplink sub-carriers are determined such that said uplink sub-carriers for said wireless devices are provided in distinct frequency subbands, wherein each frequency subband corresponds to one of said wireless devices.

18. The method according to claim 17, wherein determining channel quality indications for uplink sub-carriers for at least said addressed wireless devices comprises:
combining channel quality indications of at least two of said distinct frequency subbands.

19. The method according to claim 1, wherein how many downlink sub-carriers for each one of said wireless devices to be pairwise adjoining depends on said determined channel quality indications for said uplink sub-carriers.

20. The method according to claim 1, wherein at least one of said downlink sub-carriers and said uplink sub-carriers defines at least two channels between said wireless network node and at least one of said wireless devices.

21. A wireless network node for frequency selective scheduling of wireless devices in a communication network, the wireless network node comprising a processing unit configured to:
transmit a first packet to at least one wireless device over the entire available bandwidth of the communication network, wherein said first packet comprises information identifying which wireless devices are addressed by the first packet, and which downlink sub-carriers are used for data transmission to said addressed wireless devices; and
receive a second packet on uplink sub-carriers allocated to at least said addressed wireless devices and therefrom determine channel quality indications for said uplink sub-carriers, wherein said uplink sub-carriers are allocated to enable said channel quality indications to be determined over said entire bandwidth for at least each one of said addressed wireless devices by at least one of interpolating and extrapolating channel quality indications for at least two uplink sub-carriers, and wherein the processing unit is configured to determine that said uplink sub-carriers for each one of said wireless devices are frequency interleaved.

22. The wireless network node according to claim 21, wherein the processing unit is configured to determine that said uplink sub-carriers for each one of said wireless devices are such that different sub-carriers are used for different orthogonal frequency division multiplexing, OFDM, symbols, and such that all sub-carriers are used by all said wireless devices during at least one OFDM symbol.

23. The wireless network node according to claim 22, wherein the processing unit is configured to determine that the sub-carriers allocated to a specific wireless device are selected such that in the last one of the OFDM symbols used for channel estimation, the sub-carriers allocated for channel estimation are the same sub-carriers as those sub-carriers allocated for data in the subsequent OFDM symbols to the same wireless device.

24. A nontransitory computer readable storage medium comprising a computer program for frequency selective scheduling of wireless devices in a communication network, the computer program comprising computer program code which, when run on a processing unit of the wireless network node causes the processing unit to:
transmit a first packet to wireless devices over the entire available bandwidth of the communication network, wherein said packet comprises information identifying which wireless devices are addressed by the packet, and which downlink sub-carriers are used for data transmission to said addressed wireless devices; and
receive a second packet on uplink sub-carriers allocated to at least said addressed wireless devices and therefrom determine channel quality indications for said uplink sub-carriers, wherein said uplink sub-carriers are allocated to enable said channel quality indications to be determined over said entire bandwidth for at least each one of said addressed wireless devices by at least one of interpolating and extrapolating channel quality indications for at least two uplink sub-carriers, and wherein said uplink sub-carriers for each one of said wireless devices are determined to be frequency interleaved.

* * * * *